United States Patent
Gay et al.

(10) Patent No.: US 9,619,498 B2
(45) Date of Patent: Apr. 11, 2017

(54) METHOD AND APPARATUS FOR ADJUSTING AN INDEXING FREQUENCY BASED ON MONITORED PARAMETERS

(71) Applicant: France Telecom, Paris (FR)

(72) Inventors: Julian Gay, San Francisco, CA (US); Dominic Lee, Sunnyvale, CA (US); Pylyp Nuzhnyi, San Francisco, CA (US)

(73) Assignee: FRANCE TELECOM, Paris (FR)

( * ) Notice: Subject to any disclaimer, the term of this patent is extended or adjusted under 35 U.S.C. 154(b) by 114 days.

(21) Appl. No.: 13/931,020

(22) Filed: Jun. 28, 2013

(65) Prior Publication Data

US 2014/0006413 A1    Jan. 2, 2014

Related U.S. Application Data

(60) Provisional application No. 61/666,494, filed on Jun. 29, 2012.

(51) Int. Cl.
  *G06F 17/30* (2006.01)

(52) U.S. Cl.
  CPC .. *G06F 17/30321* (2013.01); *G06F 17/30613* (2013.01)

(58) Field of Classification Search
  CPC ......... G06F 17/30321; G06F 17/30613; G06F 3/0488; G06F 3/04883; G06F 3/0482; G06F 17/30554; G06F 19/3406; G06F 3/04842; G06F 3/04845; G06F 3/0659; G06F 2203/04104; G06F 2203/04808; G06F 3/0416; H04L 63/1433; H04L 63/1408
  See application file for complete search history.

(56) References Cited

U.S. PATENT DOCUMENTS 6,418,453 B1    7/2002  Kraft et al.
7,769,742 B1    8/2010  Brawer et al.
7,853,881 B1 *  12/2010 Aly Assal .............. G06Q 30/02
                                           715/734

(Continued)

OTHER PUBLICATIONS

Olivier Rutti, Pawe Paweł T. Wojciechowski and Andre Schiper—"Service interface: a new abstraction for implementing and composing protocols"—Proceeding SAC '06 Proceedings of the 2006 ACM symposium on Applied computing—Dijon, France—Apr. 23-27, 2006—pp. 691-696.*

(Continued)

*Primary Examiner* — Anh Ly
(74) *Attorney, Agent, or Firm* — David D. Brush; Westman Champlin & Koehler, P.A.

(57) ABSTRACT

A indexing engine and method are provided for operating an indexing engine that parses and indexes data created by a set of users associated with a business entity on a database while interacting with a service associated to the database, the method comprising: monitoring the users' interactions with the database related to a creation of new data by one or more of the users over a predefined period of time when using the service; monitoring service availability during these interactions over the same predefined period of time; and changing an indexing frequency based on both parameters associated with the monitoring of the users' interactions and the service usage conditions.

10 Claims, 3 Drawing Sheets

(56) References Cited

U.S. PATENT DOCUMENTS

| | | | | |
|---|---|---|---|---|
| 8,589,541 | B2* | 11/2013 | Raleigh | H04L 41/0893 455/405 |
| 2005/0154697 | A1* | 7/2005 | Altaf et al. | 707/1 |
| 2007/0203746 | A1* | 8/2007 | DeHaan | G06Q 50/22 705/2 |
| 2011/0153644 | A1* | 6/2011 | Kosuru | G06F 21/6218 707/769 |
| 2011/0320428 | A1 | 12/2011 | Erera et al. | |
| 2012/0047121 | A1 | 2/2012 | Canel et al. | |
| 2012/0221955 | A1* | 8/2012 | Raleigh | H04M 15/00 715/736 |
| 2012/0246154 | A1* | 9/2012 | Duan | G06F 17/30477 707/728 |
| 2012/0290647 | A1* | 11/2012 | Ellison | H04L 41/0233 709/203 |
| 2012/0290910 | A1* | 11/2012 | Kumar et al. | 715/205 |
| 2013/0006609 | A1* | 1/2013 | Dhoolia | G06F 17/274 704/9 |
| 2013/0104236 | A1* | 4/2013 | Ray | H04L 63/1408 726/25 |
| 2013/0144858 | A1* | 6/2013 | Lin et al. | 707/709 |
| 2013/0227707 | A1* | 8/2013 | Gay | H04L 63/0421 726/27 |
| 2013/0325869 | A1* | 12/2013 | Reiley | G06F 17/3002 707/741 |
| 2014/0006609 | A1* | 1/2014 | Gay | H04L 43/0876 709/224 |
| 2014/0052732 | A1* | 2/2014 | Softky | 707/741 |
| 2016/0267541 | A1* | 9/2016 | Breakey | G06Q 30/02 705/14.32 |

OTHER PUBLICATIONS

M.Saradarzadeh, S.Farhangi, J.L.Schanen, P-O.Jeannin and D.Frey—"The benefits of looping a radial distribution system with a power flow controller"—Published in: Power and Energy (PECon), 2010 IEEE International Conference on, Nov. 29-Dec. 1, 2010, Kuala Lumpur, Malaysia—pp. 723-728.*

"Google Panda", Wikipedia, Jun. 30, 2014, http://en.wikipedia.org/wiki/Google_Panda.

Aimee Sparker, "Latest Google's Updates—Know the Secrets for your Web Success", 2013, http://stylishwebdesigner.com/latest-googles-updates-know-the-secrets-for-your-web-success/.

European Search Report and Written Opinion dated Dec. 17, 2013 for corresponding European Application No. 13305872.

* cited by examiner

METHOD AND APPARATUS FOR ADJUSTING AN INDEXING FREQUENCY BASED ON MONITORED PARAMETERS

CROSS-REFERENCE TO RELATED APPLICATION

The present application is based on and claims the benefit of U.S. Provisional Patent Application No. 61/666,494, filed Jun. 29, 2012, the content of which is hereby incorporated by reference in its entirety.

BACKGROUND

Individuals and businesses are increasingly reliant on Software as a Service (SaaS)/Cloud-based services for critical aspects of their operational infrastructure. For example, a company's sales and marketing data may be stored and managed with a Salesforce service/storage, documents may be stored in a Dropbox storage, and the company calendar might be managed in a Google™ Apps Calendar.

It is important for companies who are cloud clients to consolidate their storage and have a more global vision on what it stored out there in the cloud. Data that is stored in the cloud needs to be indexed in order to be searched.

Existing indexing and crawling engine solutions are based on a time-based frequency to crawl through and retrieve data and document materials. This time-based frequency is a fixed value of regular time duration (or an interval), e.g., five seconds, five minutes, five hours, etc. Indexing tasks are scheduled for repeated execution at the regular time interval.

Most of the search engine or data warehousing services use indexing to collect and store data for informal information retrieval, such as for a query. The typical technique is to perform indexing at a predetermined time interval (FIG. 1) because there may be a required time needed for processing data, such as document parsing, metadata extraction, cleansing, compression, and/or maintenance. Thus, as is illustrated in FIG. 1, at time T1, a first indexing is performed. Various data updates occur in the system and a second indexing update is performed at time T2, which is an interval t(t1) after time T1. Subsequently, no further document updates occur, but another indexing takes place at time T3, which uses the same interval t(T1) after time T2 that was used between times T1 and T2.

Although it is known to cache data with periodic prefetching or prebuffering of data for an application based on a user's interactions with preexisting database content, such systems use only a limited set of criteria for determining the caching intervals. However, these types of systems do not take into account aspects of an enterprise in which user data creation is prevalent and various restrictions of the SaaS services and usage patterns (both individual and group) must be taken into consideration.

As an enterprise's infrastructure becomes fragmented, employees and administrators have the need for a unified search capability which provides an aggregated view across the enterprise's content that takes into account usage patterns, technical restrictions, as well as business restrictions.

SUMMARY

In order to more efficiently utilize resources in an indexing operation across an enterprise's data, a method is provided for operating an indexing engine that parses and indexes data created by a set of users associated with a business entity on a database while interacting with a service associated to the database, the method comprising: monitoring the users' interactions with the database related to a creation of new data by one or more of the users over a predefined period of time when using the service; monitoring service availability during these interactions over the same predefined period of time; and changing an indexing frequency based on both parameters associated with the monitoring of the users' interactions and the service usage conditions (including, but not restricted to, API-request limits, cost restrictions, and content-access restrictions).

A method is also provided for operating an indexing engine that parses and indexes data created by a set of users associated with a business entity or enterprise on a database while interacting with a service associated to the database, the method comprising: monitoring the users' interactions with the database when using the service; and changing an existing indexing frequency based on parameters associated with: a) the monitoring of the users' interactions; b) an attribute selected from the group consisting of: a number of retrieval requests, a number of API requests, and access times; and c) an attribute selected from the group consisting of: a cost associated with a data request, a cost associated with a user account, and a cost associated with using or accessing a system resource.

An associated indexing engine is further provided that parses and indexes data created by a set of users associated with a business entity on a database while interacting with a service associated to the database, the indexing engine comprising: a user interaction monitor that monitors the users' interactions with the database related to a creation of new data by one or more of the users over a predefined period of time when using the service; a service availability monitor that monitors service availability during these interactions over the same predefined period of time; and an indexing frequency adjuster that changes an indexing frequency based on both parameters associated with the monitoring of the users' interactions and the service availability.

Finally, a non-transitory computer program product is provided comprising a computer usable medium having a computer readable program code embodied therein, said computer readable program code adapted to be executed to implement the above-described methods.

Two key components defined herein are a User and a Service. These components and their relationship may be described as follows: a User is one who is subscribed to a Service and uses it; and a Service contains data of a User and is indexed by the method described herein.

DESCRIPTION OF THE DRAWINGS

Various embodiments of the disclosure are illustrated in the following drawings.

DETAILED DESCRIPTION OF THE EMBODIMENTS

Figure 1:
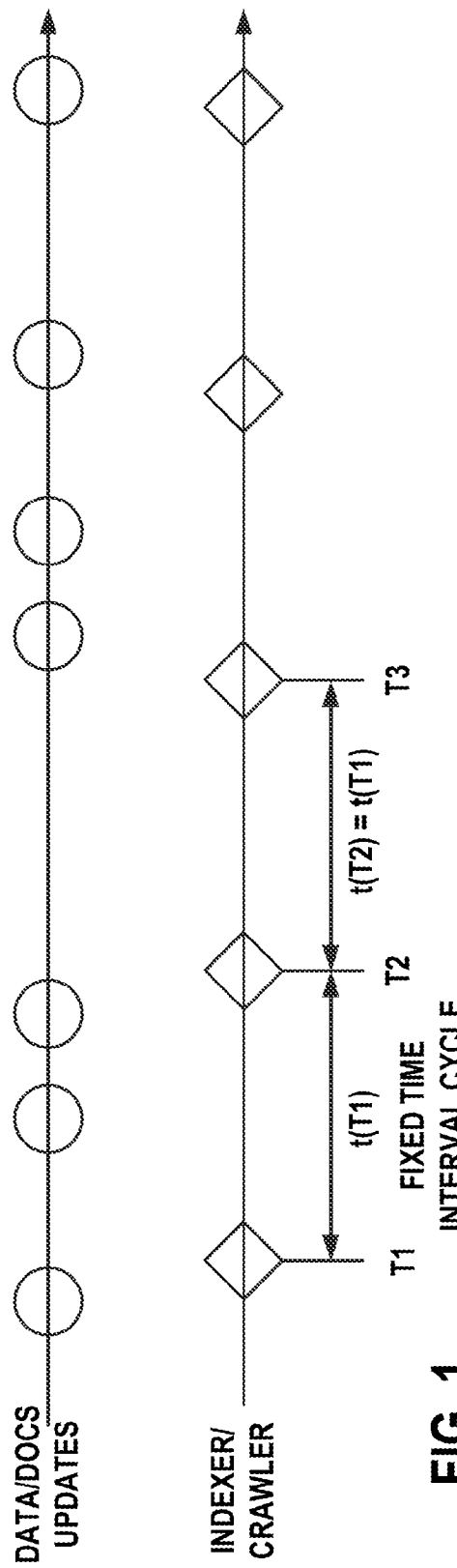
FIG. 1 is an indexing timing diagram according to the prior art.
Figure 2:
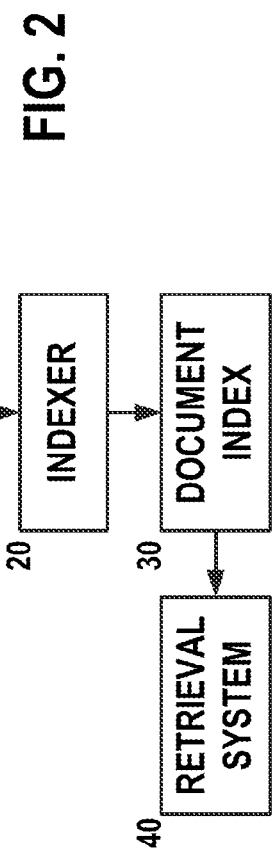
FIG. 2 is a block diagram illustrating a basic indexing scheme.

FIG. 2 illustrates a retrieval system in showing an application of a general indexing architecture. Documents or data 10 reflecting information that may be the target of an indexer 20 are accessed by the indexer 20 on some form of a timed basis. The indexer 20 is implemented as a software algorithm running on a computer processor which may be part of a standalone dedicated computer or may be integrated with a computer and processor that performs other related or unrelated functions.

The indexer produces a document index 30 which associates key words, attributes, etc. with the documents/data 10. The indexer 20 thus aggregates the data 10 into an easily searchable form. A retrieval system 40 can then be used to access the document index 30 to allow the user to quickly access the indexed information.

In a corporate context, by leveraging the application program interfaces (APIs) that many SaaS providers make available, an indexing solution can be built that accesses the content of individual employees (in these SaaS services) and presents the combined results in a unified search view. The set of employees or users having a relationship with a business entity share an attribute in that they have a level of access in creating and sharing data that distinguishes them from users outside of the set of employees or users of the business entity—thus, these users are associated with one another based on their affiliation with the business entity and some defined level of access to a set of data associated with the business entity. According to another view, the enterprise associated with the data can utilize access control information that it possesses to obtain access to the desired information.

After the initial index is created, the index needs to be maintained by adding new content (from the repositories) and removing deleted content. As noted above, historically, this has been accomplished by periodically indexing the content according to a regular periodic schedule.

Various embodiments of the disclosure address intelligent indexing of SaaS-based content, which involves the modifying the intervals between which the information is indexed, taking into account a number of factors to account for variances in the underlying services, and also the variances in how individual users access and create content, both individually and in aggregate across a group (company). Thus, the indexing tasks can be made to operate more dynamically.

Figure 3:
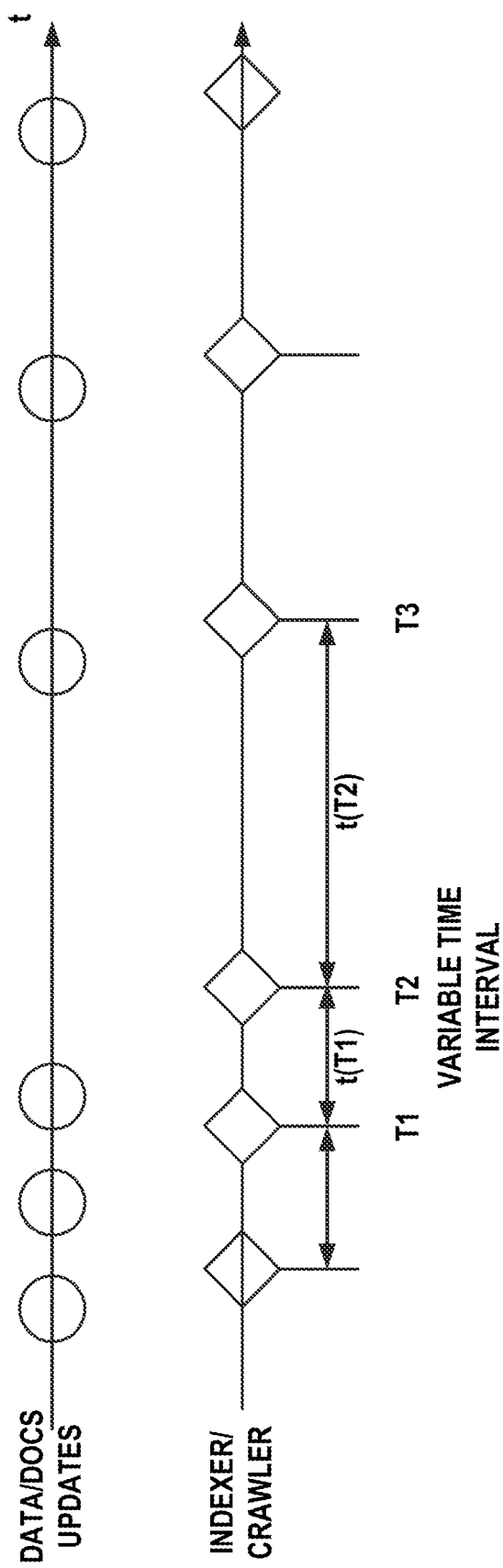
FIG. 3 is an indexing timing diagram according to an embodiment of the disclosure.

As illustrated in FIG. 3, at time T1, a first indexing is performed. Various data updates occur in the system and a second indexing update is performed at time T2, which is an interval t(t1) after time T1. Subsequently, another indexing takes place at time T3, which uses a different interval t(T2) after time T2 than that which was used between times T1 and T2. Significantly, the difference between the indexing intervals is based on a number of factors—some of these factors are knowable by virtue of the fact that in the company context, information can be known about the various users and the data being accessed that are not knowable in an individual setting. For example, aggregate information about accesses to certain types of documents, access rights, etc., can be utilized for calculating the indexing factor.

Figure 4:
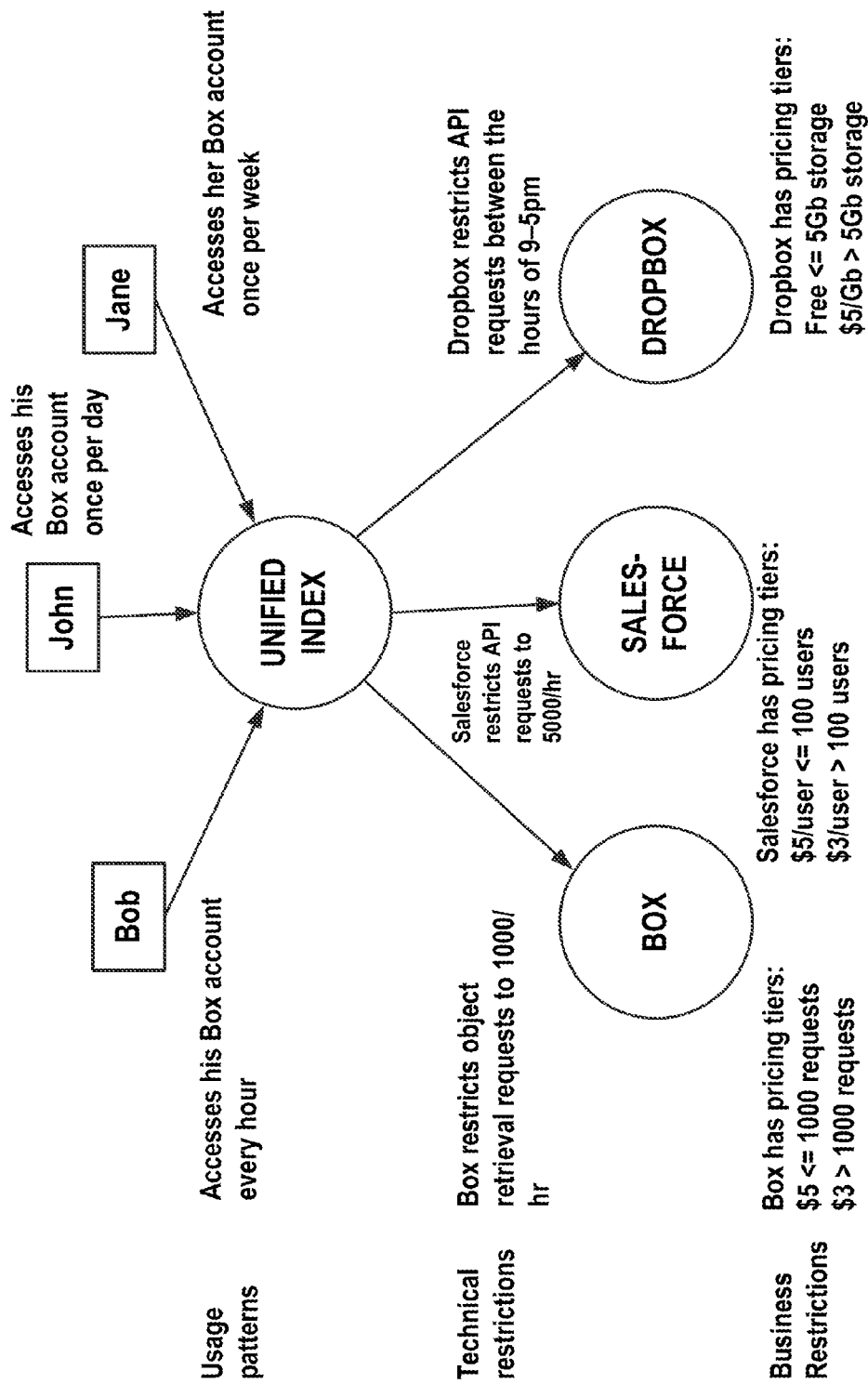
FIG. 4 is a block diagram illustrating various factors that may be used to determine the indexing interval.

FIG. 4 illustrates various factors that can be taken into account with regard to the indexing frequency. Various embodiments disclosed herein provide an indexing solution capable of factoring in: a) user behavior factors, such as usage patterns (logins, storage volumes, data throughput demands) and user creation of data (uploads for documents, multimedia, etc.) patterns, and b) service-type factors, such as technical restrictions (bandwidth, storage capacity, etc.), and business restrictions (cost per access, etc.), to provide a unified search capability of an enterprise's fragmented infrastructure.

The user behavior factors are linked to all users accessing and creating data with the service, the data being the new data to index. This may be commercial data such as sales-related information or a more generic form of data that may be used, e.g., on a drop box. The service-type factors are linked to the service itself. Employees and administrators have a need to see an aggregated view across the enterprise's content.

Since the SaaS-based services typically have different technical and operational characteristics and utilize differing business models to support their services (e.g., subscription-, per-user-, per-request-, and storage capacity-based) different techniques are needed to access and process the content. In addition, the usage patterns of individual users within a company may vary by service and content type.

For example an individual in a Sales group may access Opportunity content in a Salesforce datastore/service multiple times a day, but only access legal templates stored in the service/datastore Box relatively infrequently. In contrast, a legal admininistrator may access the legal templates in Box frequently, but only rarely access the SalesOpportunity content in Salesforce.

The dynamic nature of the indexing takes into consideration the User's behaviors and availability aspects of the service. The intervals between indexing tasks are dynamically changed, based upon a calculation that may include various parameters.

Referring to FIG. 4 various parameters that may be taken into account in adjusting the interval are illustrated. As can be seen, the interval may be adjusted based on usage patterns, technical restrictions, and business restrictions.

A list of parameters related to usage patterns or User behavior may include, but is not limited to: a) how actively a user interacts with a service; b) amount of time spent on a service; c) the frequency with which a user logs onto/logs off of a service; d) a last user login to a service. Technical restrictions can related to: e) peak hours (e.g., office hours); f) an amount of data stored on a service of a user; and g) the type of data itself (e.g., a word-processing document vs. call logs).

A list of parameters related to the Service itself may also incorporate technical restrictions, than may include, but is not limited to: h) API limitations; i) the amount of storage/transactions allowed per user; j) the type of data: non real-time vs. real-time (such as documents, web pages, CRM data vs. news feeds, call logs, e-mails, etc.); and k) connectivity and consumption bandwidth.

Finally, there may be business restrictions associated with accessing the information, such as cost of making a request, cost per user, and cost per storage.

In FIG. 4, it can be seen that User Bob accesses his Box account every hour, whereas John accesses his Box account once per day, and Jane accesses her Box account even less—only once per week. FIG. 4 further illustrates exemplary technical restrictions, where the Box restricts object retrieval requests to 1000/hr., whereas the Salesforce restricts API requests to 5000/hr., and the Dropbox restricts API requests between the hours of 9-5 pm. Finally, FIG. 4 illustrates exemplary business restrictions that include pricing variances based on number of requests (for accesses to Box), users (number of users accessing Salesforce), or Dropbox (based on storage amount).

Any combination of the above parameters could be utilized to affect the interval between indexing. Each parameter used may be calculated with a weighting factor related to how a User interacts with a certain Service. This gives the indexing engine an optimal way to handle connectivity to the service and the amount of data to be parsed in and out the engine.

The dynamic indexing can improve the processing performance. Generally speaking, for a lower frequency service, the interval between two consequent indexing actions is longer, compared to an interval that would be used for a fixed time interval. That means the number of executions over time are fewer, which thus reduces the number of process and resources, such as memory and API requests, needed for the indexing.

The indexing interval is thus lengthened for an increasingly less frequently used, less interacted with, and non-real time data service, given a sufficiently long period of time over which no changes are sent or the incremental updates and changes are minimal. Since the changes are very small (or minimally incremental), when a user queries the indices, the chances of missing relevant results or hitting outdated results are minimal as well.

In contrast, the indexing interval is thus shortened for an increasingly more frequently used highly interacted with, and real time data service. Because the changes are happening very often or continuously, the indexer needs to update the indices much more often to make sure the data is consistent enough.

EXAMPLE

In an example, an indexing of content is performed at time T1. In order to determine the next time for performing an indexing, the following parameters are taken into account: the frequency of a user search is 10 searches/day; the frequency of content changes is 20 documents/day; the frequency of a user login is 2 times/day; and the API limits accesses to 50 requests/day.

Weighting factors may be applied to each factor. For example, the following weighting factors are applied: w1=0.2·search; w2=0.1·doc; w3=0.05·login; and w4=0.2·request Based on this information, the next index time may be computed according to the following equation:

$$t(T1) = (24 \text{ hours}/10 \text{ searches}) * w1 + (24 \text{ hrs}/20 \text{ docs}) * w2 +$$
$$(24 \text{ hrs}/2 \text{ logins}) * w3 + (24 \text{ hrs}/50 \text{ requests}) * w4$$
$$= 2.4(0.2) \text{ h} + 1.2(0.1) \text{ h} + 12(0.05) \text{ h} + 0.48(0.2) \text{ h}$$
$$= 1.296 \text{ h}$$

So, the determined next index time is: $T2=T1+t(T1)$.

Once the indexing is performed at time T2, the time for the next indexing is calculated. However, certain variables have changed since the time of prior indexing. At time T2, the following is true: the frequency of a user search is 50 searches/day; the frequency of content changes is 50 documents/day; the frequency of a user login is 10 times/day; and the API limits accesses to 50 requests/day.

Based on this information, the next index time may be computed as follows:

$$t(T2) = (24 \text{ hours}/50 \text{ searches}) * w1 + (24 \text{ hrs}/50 \text{ docs}) * w2 +$$
$$(24 \text{ hrs}/10 \text{ logins}) * w3 + (24 \text{ hrs}/50 \text{ requests}) * w4$$
$$\text{-continued}$$
$$= 0.48(0.2) \text{ h} + 0.48(0.1) \text{ h} + 2.4(0.05) \text{ h} + 0.48(0.2) \text{ h}$$
$$= 0.36 \text{ h}$$

So, the determined next index time is: $T3=T2+t(T2)=T1+t(T1)+t(T2)$.

As can be seen, because the frequencies of search, content change and user logins have increased, such $t(T2)<t(T1)$.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-volatile computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the disclosure, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the disclosure may be described in terms of functional block components and various processing steps. Such functional blocks may be realized by any number of hardware and/or software components that perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, embodiments of the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the disclosure and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

What is claimed is:

1. A method for operating an indexing engine that parses and indexes, at an indexing frequency, data created by a set of users associated with a business entity on a database while interacting with a service associated with the database, the method comprising:
    monitoring, using a processor, the users' interactions with the database related to a creation of new data by one or more of the users over a predefined period of time when using the service;
    monitoring, using the processor, service availability during these interactions over the same predefined period of time; and
    indexing, using the processor, the database for the new data created by the one or more users in order to be searched,
    wherein the indexing frequency is a frequency at which an index associated with the data created in the database by the set of users associated with the business entity is updated with the processor based on first parameters associated with the monitoring of the users' interactions in view of usage patterns of the service, and based on second parameters associated with the service availability in view of at least one of technical restrictions or business restrictions of the service; and
    wherein the method further comprises: providing a set of weighting factors that are utilized with at least one of the first parameters or the second parameters to determine the indexing frequency.

2. The method of claim 1, further comprising:
    correlating more frequent user access with a more frequent indexing.

3. The method of claim 1, further comprising:
    performing the monitoring of the users' interactions by utilizing an application program interface of an SaaS provider.

4. The method of claim 1, further comprising:
    distinguishing between types of data created by or accessed by users to determine the indexing frequency.

5. The method of claim 1, further comprising:
    providing an aggregated view of the indexed data across an enterprises content of data.

6. The method of claim 1, further comprising:
    utilizing access control information to access data associated with the indexing.

7. A method for operating an indexing engine that parses and indexes, at an indexing frequency, data created by a set of users associated with a business entity or enterprise on a database while interacting with a service associated with the database, the method comprising:
    monitoring, with a processor, the users' interactions with the database when using the service; and
    indexing, with the processor, the database for new data created by the set of users in order to be searched,
    wherein the indexing frequency is a frequency at which an index associated with the data created in the database by the set of users associated with the business entity is updated with the processor based on first parameters associated with the monitoring of the users' interactions, and based on second parameters associated with an availability of the service associated with the database, and wherein the indexing, with the processor, the database for the new data created by the set of users in order to be searched is based on the first parameters and the second parameters, and wherein the first parameters are associated with the monitoring of the users' interactions in view of usage patterns of the service, and wherein the second parameters are associated with the service availability in view of at least one of:
        a) a technical restrictions attribute selected from the group consisting of: a number of retrieval requests, a number of API requests, and access times; or
        b) a business restrictions attribute selected from the group consisting of: a cost associated with a data request, a cost associated with a user account, and a cost associated with using or accessing a system resource, and
    wherein the method further comprises: providing a set of weighting factors that are utilized with at least one of the first parameters or the second parameters to determine the indexing frequency.

8. The method of claim 7, wherein the system resource is selected from the group consisting of: data storage capacity, processor cycles, and communication bandwidth.

9. An indexing engine that parses and indexes, at an indexing frequency, data created by a set of users associated with a business entity on a database while interacting with a service associated with the database, the indexing engine comprising:
- a user interaction monitor that monitors the users' interactions with the database related to a creation of new data by one or more of the users over a predefined period of time when using the service;
- a service availability monitor that monitors service availability during these interactions over the same predefined period of time; and
- an indexing frequency adjuster that indexes the database for new data created by the set of users in order to be searched, wherein the indexing frequency is a frequency at which an index associated with the data created in the database by the set of users associated with the business entity is updated with the processor based on first parameters associated with the monitoring of the users' interactions in view of usage patterns of the service, and based on second parameters associated with the service availability in view of at least one of technical restrictions or business restrictions of the service; and
- wherein the indexing frequency adjuster provides a set of weighting factors and utilizes the weighting factors with at least one of the first parameters or the second parameters to determine the indexing frequency.

10. A non-transitory computer usable medium comprising a computer readable program code embodied therein, said computer readable program code adapted to be executed by a processor to implement a method for operating an indexing engine that parses and indexes, at an indexing frequency, data created by a set of users associated with a business entity on a database while interacting with a service associated with the database, the method comprising:
- monitoring, using the processor, the users' interactions with the database related to a creation of new data by one or more of the users over a predefined period of time when using the service;
- monitoring, using the processor, service availability during these interactions over the same predefined period of time; and
- indexing, using the processor, the database for new data created by the set of users in order to be searched,
- wherein the indexing frequency is a frequency at which an index associated with the data created in the database by the set of users associated with the business entity is updated with the processor based on first parameters associated with the monitoring of the users' interactions in view of usage patterns of the service, and based on second parameters associated with the service availability in view of at least one of technical restrictions or business restrictions of the service; and
- wherein the method further comprises: providing a set of weighting factors that are utilized with at least one of the first parameters or the second parameters to determine the indexing frequency.

* * * * *